US008834316B2

(12) United States Patent
Berg et al.

(10) Patent No.: US 8,834,316 B2
(45) Date of Patent: Sep. 16, 2014

(54) HIGH RATIO GEAR REDUCER

(75) Inventors: Larry Berg, Rockford, IL (US); Wes Burandt, Rockford, IL (US)

(73) Assignee: BVR Technologies, Rockford, IL (US)

( * ) Notice: Subject to any disclaimer, the term of this patent is extended or adjusted under 35 U.S.C. 154(b) by 740 days.

(21) Appl. No.: 12/326,074

(22) Filed: Dec. 1, 2008

(65) Prior Publication Data

US 2009/0221396 A1    Sep. 3, 2009

Related U.S. Application Data

(60) Provisional application No. 60/991,699, filed on Nov. 30, 2007.

(51) Int. Cl.
*F16H 57/08* (2006.01)
*F16H 55/18* (2006.01)
*F16H 1/28* (2006.01)

(52) U.S. Cl.
CPC ............... *F16H 1/28* (2013.01); *F16H 1/2818* (2013.01); *F16H 2001/2881* (2013.01)
USPC ............................. 475/341; 475/347; 74/409

(58) Field of Classification Search
USPC ................................................. 475/341, 342
See application file for complete search history.

(56) References Cited

U.S. PATENT DOCUMENTS

| 1,431,167 | A | * | 10/1922 | McCollum | 475/342 |
| 2,401,875 | A | * | 6/1946 | Lawler | 475/342 |
| 2,690,685 | A | * | 10/1954 | Donandt | 475/335 |
| 3,705,522 | A | * | 12/1972 | Ogawa | 475/341 |
| 3,792,629 | A | * | 2/1974 | Applebury | 475/342 |
| 4,091,688 | A | * | 5/1978 | Huffman | 475/331 |
| 4,091,689 | A | * | 5/1978 | Huffman | 475/331 |
| 4,429,594 | A | * | 2/1984 | Heller | 475/342 |
| 4,440,044 | A | * | 4/1984 | Heller | 475/162 |
| 4,757,728 | A | * | 7/1988 | Pitsch | 475/53 |
| 4,850,247 | A | * | 7/1989 | Yu | 475/342 |
| 4,942,781 | A | * | 7/1990 | Hori | 475/342 |
| 4,954,123 | A | * | 9/1990 | Kurywczak | 475/179 |
| 5,078,665 | A | * | 1/1992 | Castellani | 475/342 |
| 5,435,794 | A | * | 7/1995 | Mori et al. | 475/343 |
| 5,577,976 | A | * | 11/1996 | Haka | 475/280 |
| 6,461,265 | B1 | * | 10/2002 | Graham et al. | 475/5 |
| 2005/0235767 | A1 | * | 10/2005 | Shimizu et al. | 74/425 |

* cited by examiner

*Primary Examiner* — Troy Chambers
*Assistant Examiner* — Lillian Nguyen
(74) *Attorney, Agent, or Firm* — Christie, Parker & Hale, LLP

(57) ABSTRACT

A gear reducer includes a rotatable planet carrier supporting at least one planetary gear for axial rotation thereon, a stationary ring gear extending around and engageable with the at least one planetary gear, and a moveable ring gear extending around and engageable with the at least one planetary gear. A pitch diameter of the stationary ring gear is substantially identical to a pitch diameter of the moveable ring gear.

14 Claims, 5 Drawing Sheets

US 8,834,316 B2

HIGH RATIO GEAR REDUCER

CROSS-REFERENCE TO RELATED APPLICATION(S)

This application claims priority to and the benefit of U.S. Provisional Application No. 60/991,699, filed at the United States Patent and Trademark Office on Nov. 30, 2007, the entire content of which is incorporated herein by reference.

FIELD OF THE INVENTION

The present invention relates generally to an improved gear reducer, and more particularly to a high ratio planetary gear reducer.

BACKGROUND OF THE INVENTION

Conventional gear reducers include an input, a stationary ring gear, a moveable ring gear, and at least one planetary gear, wherein the planetary gear teeth mesh with stationary and moveable ring gear teeth. Such conventional gear reducers may be used to obtain high gear reduction ratios, but since the stationary ring gear and the moveable ring gear have different numbers of teeth to allow for relative movement between the two gears, typically two sets of planetary gears are required, one set of planetary gears to mesh with each of the stationary ring gear and the moveable ring gear.

However, devices have been developed whereby a single set of planetary gears mesh with both the stationary ring gear and the moveable ring gear. In one such arrangement, in which the stationary ring gear and the moveable ring gear have different pitch diameters, the standard addendum dimensions of the ring gears are modified to yield equal internal diameters.

SUMMARY OF THE INVENTION

A gear reducer is provided including a rotatable planet carrier supporting at least one planetary gear for axial rotation thereon. A stationary ring gear extends around and is engageable with the at least one planetary gear and a moveable ring gear extends around and is also engageable with the at least one planetary gear. A pitch diameter of the stationary ring gear is substantially identical to a pitch diameter of the moveable ring gear. In one embodiment, the effective point of force transfer between the at least one planetary gear and the stationary ring gear is substantially the same as the effective point of force transfer between the at least one planetary gear and the moveable ring gear.

Further, the gear reducer may also include a housing for the at least one planetary gear, the stationary ring gear, and the moveable ring gear, and an output driven by the moveable ring gear. A spring compliance member may be between the housing and the output such that the spring compliance member reduces backlash of the gear reducer. The spring compliance member may be generally flat annular resilient member, such as an O-ring.

In one embodiment, an input is provided for driving the gear reducer. The input may be, for example, an input shaft fixedly attached to the rotatable planet carrier by a set screw or a sun gear engageable with the at least one planetary gear.

The at least one planetary gear may have a plurality of planetary gear teeth, wherein the stationary ring gear has a plurality of stationary ring gear teeth engageable with the plurality of planetary gear teeth, and wherein the moveable ring gear has a plurality of moveable ring gear teeth engageable with the plurality of planetary gear teeth. The difference between the number of stationary ring gear teeth and the number of moveable ring gear teeth may be a multiple of the number of planetary gears and, in one embodiment, the number of stationary ring gear teeth is not equal to the number of moveable ring gear teeth.

In one embodiment, the effective point of force transfer between the at least one planetary gear and the stationary ring gear is substantially the same as the effective point of force transfer between the at least one planetary gear and the moveable ring gear.

DETAILED DESCRIPTION OF THE INVENTION

As shown in FIGS. 1-7, embodiments of the present invention are directed to a gear reducer typically having a gear reduction ratio of greater than 100 that may be accomplished by a single stage gear reduction or by a multiple stage gear reduction. The gear reducer includes at least one planetary gear orbiting an input axis, the planetary gear simultaneously engaging a stationary ring gear and a movable ring gear within a housing. As teeth of the planetary gear(s) engage teeth of the stationary ring gear and teeth of the moveable ring gear, the moveable ring gear rotates with respect to the stationary ring gear. The moveable ring gear has a different number of teeth than the stationary ring gear, yet it has the same operating pitch diameter as the stationary ring gear, allowing the planetary gear teeth to adequately mesh with the stationary ring gear teeth and the moveable ring gear teeth.

Figure 1:
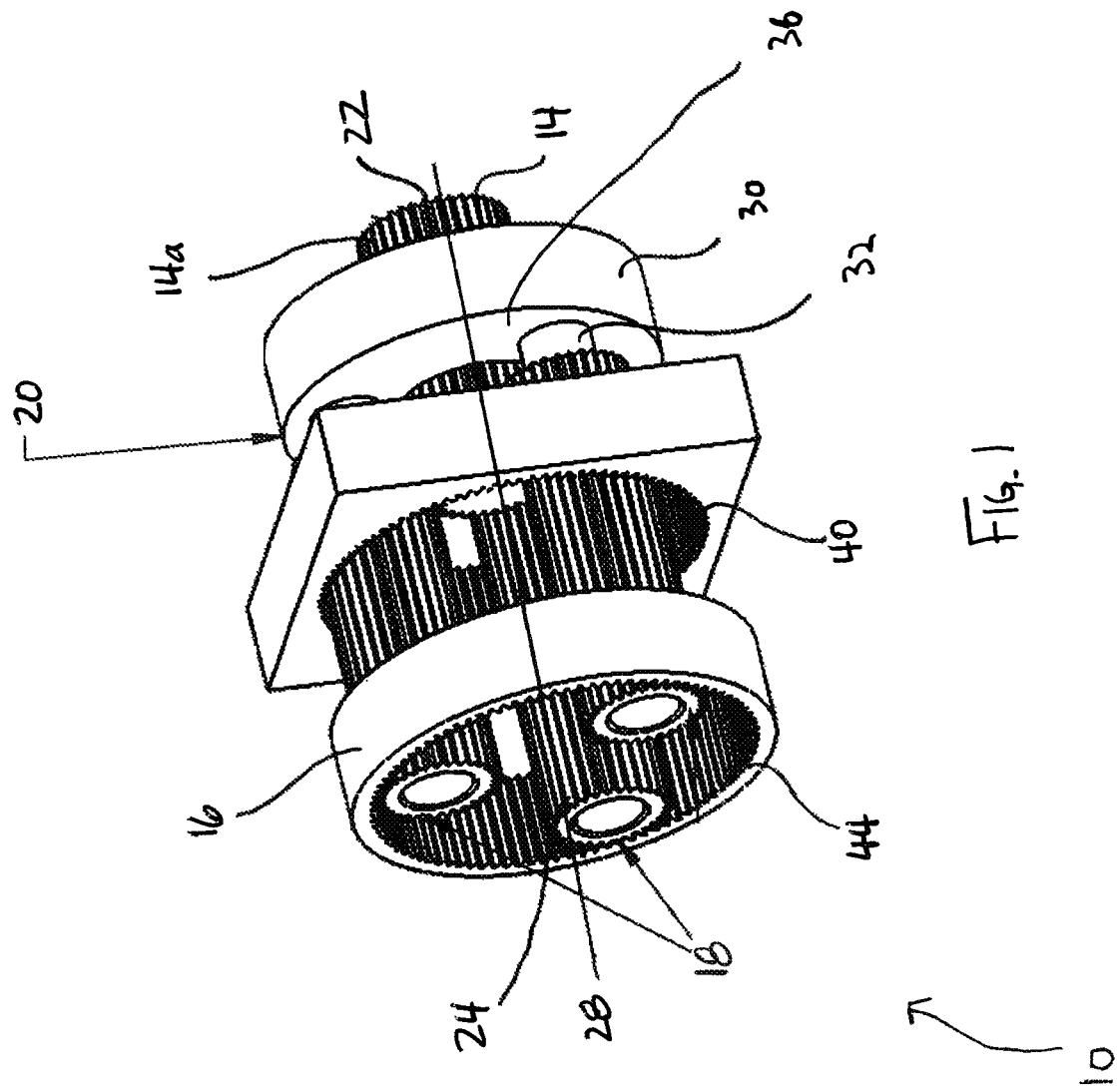
FIG. 1 is a partially exploded orthogonal view of an exemplary embodiment of a gear reducer of the present invention.
Figure 2:
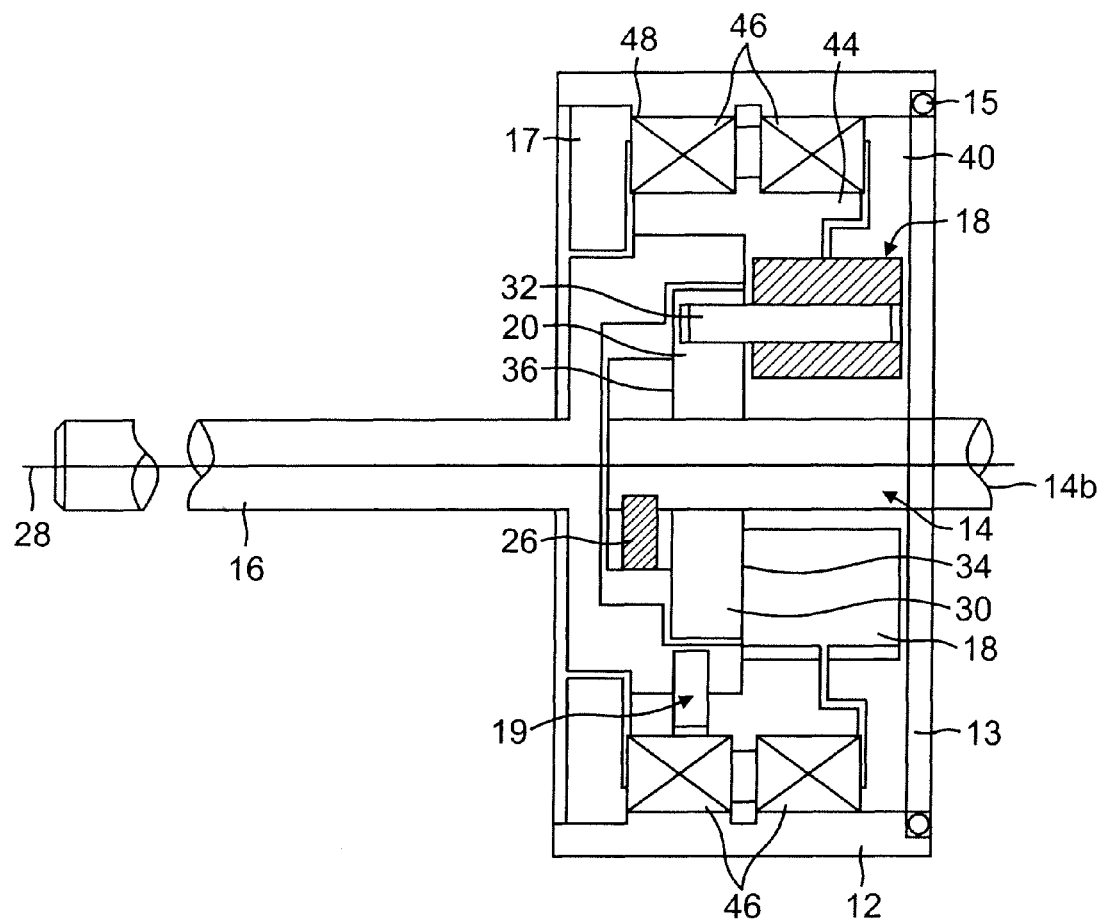
FIG. 2 is a cross-sectional view of another embodiment of a gear reducer located within a housing.

With reference now to FIGS. 1 and 2, the gear reducer 10 includes a housing 12 containing the gears of the gear reducer, the housing remaining stationary relative to a rotating input 14 and a rotating output 16. In one exemplary embodiment, the housing 12 may be made of a metallic material, such as aluminum or steel, or any other material suitably rigid to provide stability for the gear reducer 10 against the forces created by rotation of the input 14. Examples of such materials include synthetic polymeric materials, such as resinous materials. The housing 12 includes a first end cap 13 with a peripheral O-ring 15 sealing a first open end of the housing and a second end cap 17 threaded to the housing and sealing a second open end of the housing. As will be understood by one of ordinary skill in the art, the first and second end caps 13, 17 may have appropriately sized openings to accommodate the input 14 and output 16. The input 14 may be driven by an exterior driving component, such as a motor or drive shaft located outside the housing 12. Additionally, the output 16 may be integral with a moveable ring gear 44 (FIG. 1), or may be connected to the moveable ring gear by a pin 19 (FIG. 2), such that rotation of the moveable ring gear results in rotation of the output 16, as described in more detail below.

In one exemplary embodiment, as shown in FIG. 1, the input 14 may be a sun gear 14a having circumferential sun gear teeth 22 that mesh with circumferential planetary gear teeth 24 on three planetary gears 18 orbiting the sun gear. Accordingly, the number of revolutions of the sun gear 14*a* is greater than the number of orbits of each planetary gear 18 around the sun gear, resulting in a gear reduction between the input 14 (sun gear 14*a*) and the planetary gears 18. According to this embodiment, the teeth of the planetary gear 18 have a constant profile along the axes of the gears.

In another exemplary embodiment, as shown in FIG. 2, the input 14 may be a shaft 14*b* or other driving device attached directly to a planetary gear carrier 20 such that the number of revolutions of the shaft 14*b* equals the number of orbits of the planetary gears 18 around the shaft. The shaft 14*b* may be attached to the planetary gear carrier 20 by, for example, a set screw 26, or the shaft may be integral with the planetary gear carrier.

The planetary gear carrier 20 is rotatably mounted within the housing 12 about a central longitudinal axis 28. The planetary gear carrier 20 includes a base 30 having a front surface 34 facing toward an entry point of the input 14 into the housing 12 and a rear surface 36 facing toward an exit point of the output 16 from the housing. At least one planetary gear support 32 is mounted on and extends perpendicularly from the front surface 34 (FIG. 1) or the rear surface 36 (FIG. 2) of the base 30. Each planetary gear support 32 is adapted to carry a single planetary gear 18, and, in one exemplary embodiment, comprises an elongate cylinder having a portion embedded within the base 30 and a portion protruding from the base on which the planetary gear is rotatably mounted. Where a multiple-planetary gear configuration is employed (FIG. 1), the multiple planetary gear supports 32 are equally radially spaced from each other on the base 30.

A stationary ring gear 40 and the moveable ring gear 44 are mounted within the housing 12 in a configuration to constantly engage the planetary gear(s) 18 as described in more detail below. The stationary ring gear 40 is fixedly secured to the housing 12 and contains a plurality of internal, involute stationary ring gear teeth 38. The moveable ring gear 44 is rotatably mounted within the housing 12, supported by a plurality of bearings 46 abutting an interior surface 48 of the housing, and contains a plurality of internal, involute moveable ring gear teeth 42.

Each planetary gear 18 contains a plurality of external, involute planetary gear teeth 24 adapted to simultaneously engage the stationary ring gear teeth 38 and the moveable ring gear teeth 42. In order for the moveable ring gear 44 to rotate relative to the stationary ring gear 40, the moveable ring gear has a different number of teeth than the stationary ring gear. Despite the different numbers of teeth on the stationary and moveable ring gears 40, 44, the planetary gear teeth 24 adequately meshes with the teeth 38, 42 on both the stationary and moveable ring gears to prevent jamming of the gear mechanism. In accordance with embodiments of the present invention, and also with reference to FIG. 3, the teeth 38, 42 of the stationary ring gear 40 and the moveable ring gear 44 are configured to have identical or substantially identical pitch diameters to allow the planetary gear teeth 24 to mesh with the stationary and moveable ring gear teeth 38, 42.

Pitch diameter, sometimes referred to as "theoretical pitch diameter," is defined as the number of teeth on a gear divided by diametral pitch. As is commonly understood, gear tooth sizes are designated by diametral pitch, which is the number of teeth per inch of diameter of the pitch circle. The pitch circle is the circle whose periphery is the pitch surface, or the surface of an imaginary circle that rolls without slippage with a pitch circle of a mating gear. Another form of pitch diameter relates to force transfer between gears, which can be referred to as an "operating pitch diameter." Operating pitch diameter may be defined as the effective point of force transfer between gears. When the words "pitch diameter" are used alone in this specification, they mean the operating pitch diameter. Thus, when the stationary ring gear and the moveable ring are defined as having "substantially identical pitch diameters," this means that the effective point of force transfer between the planetary gear 18 and the stationary ring gear 40 is the substantially the same as the effective point of force transfer between the planetary gear and the moveable ring gear 44.

Figure 3:
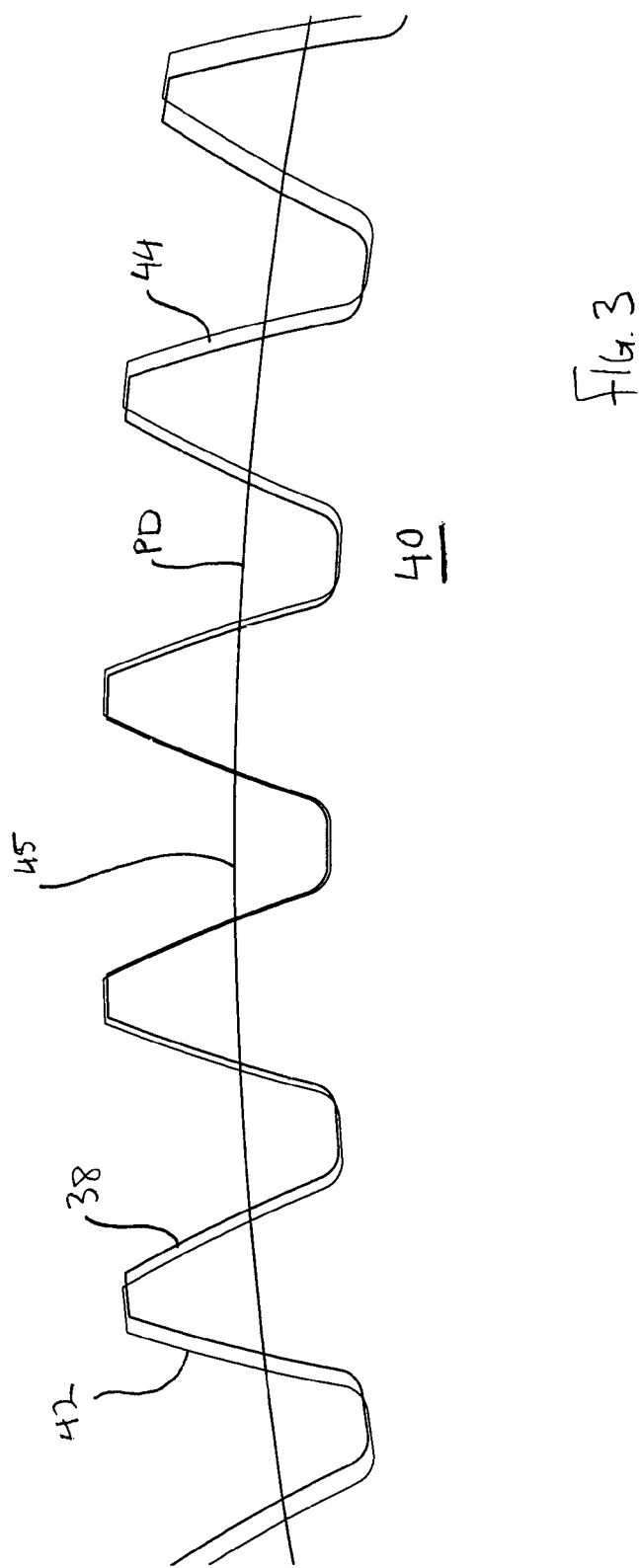
FIG. 3 is a detail view showing the outline of an exemplary moveable ring gear and an exemplary stationary ring gear of the present invention superimposed over one another.

An exemplary embodiment of the stationary ring gear 40 and the moveable ring gear 44 having a substantially identical operating pitch diameter is shown in FIG. 3. As shown in the figure, a 96 diametral pitch tool may be used to cut 96 teeth 38 into the stationary ring gear 40, resulting in a pitch diameter 45 of 1 inch, indicated by the arcuate line "PD" dividing the teeth. Similarly, a 93 diametral pitch tool has been used to cut 93 teeth 42 into a moveable ring gear 44, also resulting in a pitch diameter 45 of 1 inch, indicated by the line "PD." Accordingly, such a configuration allows the teeth 24 of a single planetary gear 18, or a single set of planetary gears, to adequately mesh with the teeth 38, 42 of the stationary and moveable ring gears 40, 44, and, upon rotation of the planetary gear(s), causes rotation of the moveable ring gear with respect to the stationary ring gear. Additionally, since the profiles of the teeth 38, 42 are similar and since the gears 40, 44 have the same pitch diameter, the pressure angles between the planetary gear teeth 24 and the stationary and moveable ring gear teeth are substantially similar, resulting in a smooth operation of the gear reducer 10.

Figure 4:
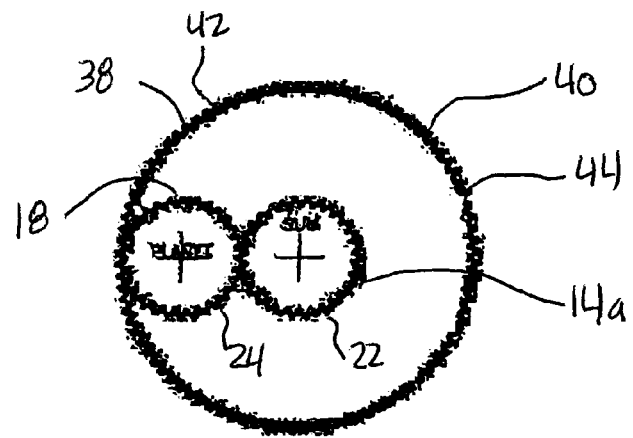
FIGS. 4, 5, and 6 are cross-sectional views of exemplary arrangements of planetary gears of the present invention.
Figure 5:
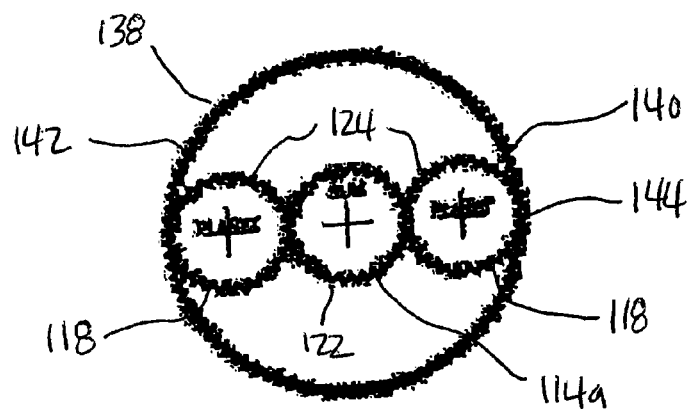
Figure 6:
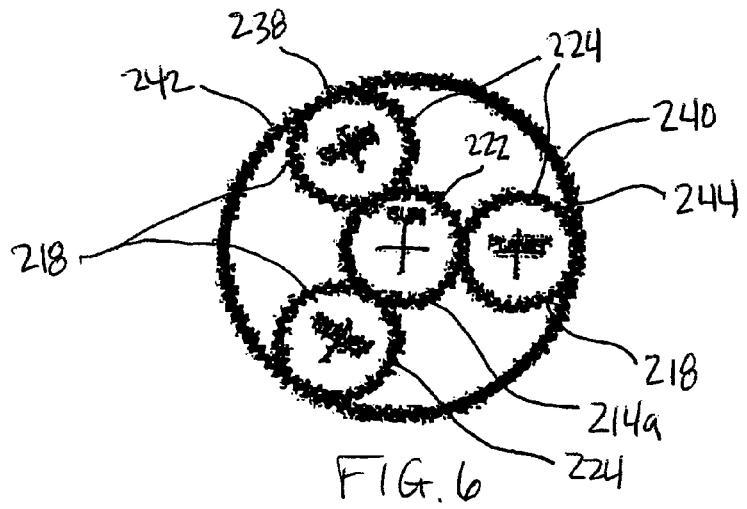

With reference now to FIGS. 4-6, exemplary configurations of planetary gears 18 are shown in accordance with the present invention. To properly assemble the gears, the respective tooth sums of each ring gear and the sun gear (if applicable) divided by the number of planetary gears results in a whole number. Thus, if two planetary gears 18 are used, the difference in the number of teeth of the stationary ring gear 40 and the moveable ring gear 44 equals two or a multiple of two.

In the gear configurations shown in FIGS. 4-6, the stationary ring gear and the moveable ring gear are oriented adjacent to each other such that the planetary gear(s) contacts both the stationary ring gear and the moveable ring gear. However, as will be appreciated, the gears may be oriented in a variety of configurations each achieving the same results as the configurations depicted in FIGS. 4-6.

With reference now to FIG. 4, a single planetary gear 18 is shown contacting the sun gear 14*a*, the stationary ring gear 40, and the moveable ring gear 44 such that the planetary gear teeth 24 mesh with sun gear teeth 22 and stationary and ring gear teeth 38, 42. In such a configuration, the difference between the number of stationary and moveable ring gear teeth 38, 42 is one.

With reference to FIG. 5, two planetary gears 118 are located on generally opposite sides of the sun gear 114*a* such that planetary gear teeth 124 mesh with sun gear teeth 122 and stationary and moveable ring gear teeth 138, 142. In such a configuration, the difference between the number of stationary and moveable ring gear teeth 138, 142 is two. In a specific example with reference to FIG. 5, when the number of planetary gears 118 ($P_n$) is 2, the number of teeth 138 in the stationary ring gear 140 ($R_o$) is 92, the number of teeth 142 in the moveable ring gear 144 ($R_f$) is 90, and the number of teeth 122 in the sun gear 114*a* ($S_{th}$) is 30, the planetary ratio ($R_p$) is ($R_f/S_{th}$) +1. As such the planetary ratio $R_p$ in this example is 4. The overall gear ratio ($O_{ar}$) is $R_p*(R_o/P_n)$ or in this case, $O_{ar}=4*(92/2)=184$.

Similarly, with reference to FIG. 6, three planetary gears 218 are equally spaced around the sun gear 214a such that the planetary gear teeth 224 mesh with the sun gear teeth 222. Further, difference between the stationary and moveable ring gear teeth 238, 242 is three. Accordingly, the number of planetary gears 218 $P_n$ is 3, and if the number of teeth 238 in the stationary ring gear 240 $R_o$ is 93, the number of teeth 242 in the moveable ring gear 244 $R_f$ is 90, and the number of teeth 222 in the sun gear 214a $S_n$ is 30, the planetary ratio $R_p$ is 4 and the overall gear ratio $O_{ar} = R_p * (R_o/P_n) = 4*(93/3) = 124$.

As will be apparent to one of ordinary skill in the art, and as discussed herein, the sun gear 14a may be replaced by an input shaft 14b and a planetary gear carrier 20 to drive the planetary gears 18. Additionally, more than three planetary gears may also be used.

Operation of the gear reducer 10 will now be described. As noted above, an external device, such as a motor or input shaft, drives the input 14, whether the input is a sun gear 14a (FIG. 1) or a shaft 14b (FIG. 2). Rotation of the input 14 results in rotation of the planetary gear(s) 18 either by contact between the sun gear teeth 22 and the planetary gear teeth 24, or by rotation of the planetary gear carrier 20 by the input 14. Since the planetary gear(s) 18 are located such that the planetary gear teeth 24 mesh with both the stationary ring gear teeth 38 and the moveable ring gear teeth 42, and since the stationary ring gear 40 has a different number of teeth than the moveable ring gear 44, rotation of the planetary gear(s) results in rotation of the moveable ring gear with respect to the stationary ring gear. Rotation of the moveable ring gear 44 results in simultaneous rotation of the output 16, either because the output is integral with the moveable ring gear (FIG. 1) or because the moveable ring gear is directly attached to the output (FIG. 2) by, for example, the pin 19.

Figure 7:
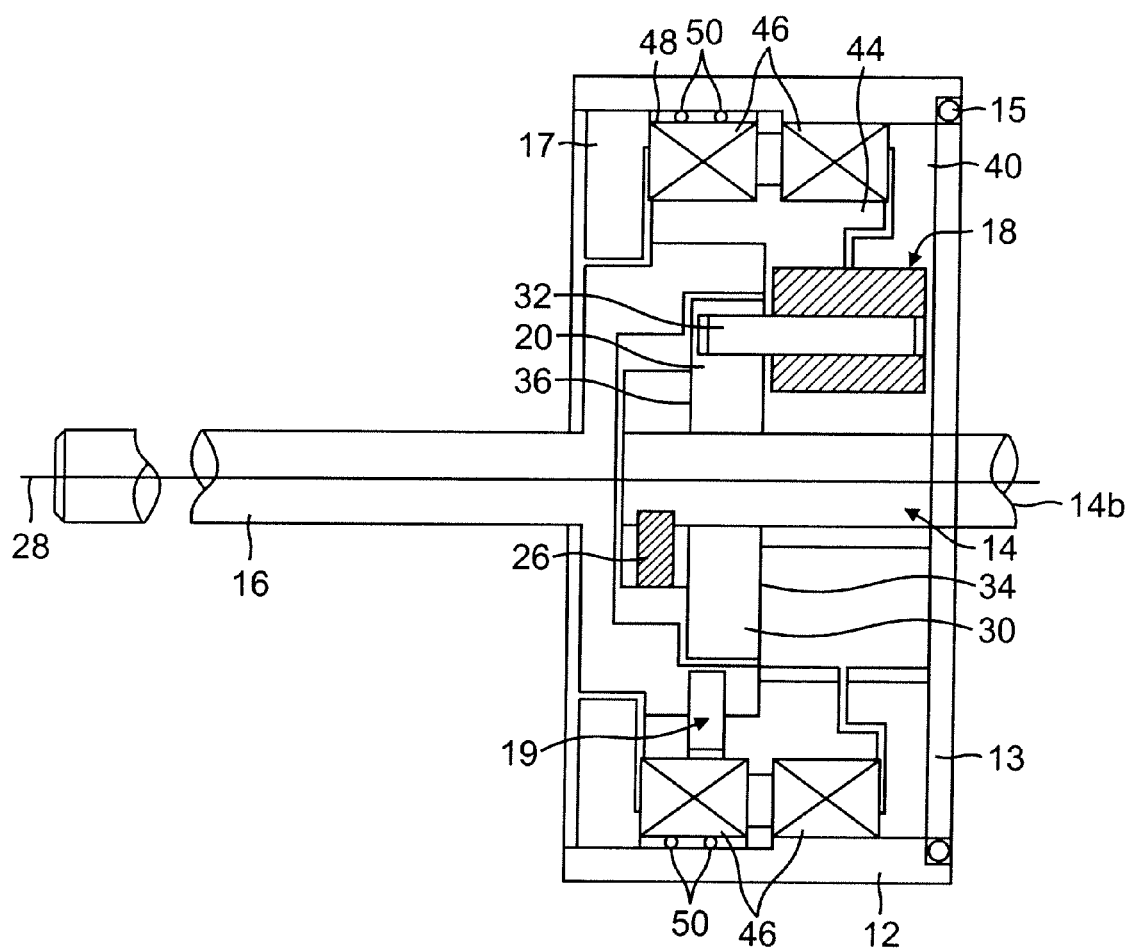
FIG. 7 is a cross-sectional view of another exemplary gear reducer of the present invention.

Another exemplary embodiment of the present invention is shown with reference to FIG. 7. To the extent that the components shown in FIG. 7 are the same or substantially similar to those already described, the same reference numerals are used to designate such components. With reference to FIG. 7, a single planetary gear 18 is employed, thereby creating the potential for an eccentricity in the gear mechanism. Spring compliance members 50 may be added, for example, between the bearing 46 and the interior surface 48 of the housing 12 to permit dimensioning of the gear reducer 10 for mechanical interference. However, it will be appreciated that spring compliance members may also be located in other places within the gear reducer to achieve the same purpose. In one exemplary embodiment, the spring compliance members 50 may be a plurality of O-rings. However, the spring compliance members 50 may also be flat, annular rubber is members, or any other suitable resilient member. The addition of the spring compliance member 50 permits the gears to be constructed in a state of zero tolerance or with a slight mechanical interference such that any binding between the gears may be substantially avoided by deflection of the moveable ring gear 44, thereby creating a condition of minimal or zero backlash.

Although exemplary embodiments in accordance with the present invention have been described, one of ordinary skill in the art will appreciate that various modifications may be made to the embodiments without departing from the spirit and scope of the invention as described and claimed as follows.

What is claimed is:

1. A gear reducer comprising:
   a rotatable planet carrier supporting at least one planetary gear for axial rotation thereon;
   a stationary ring gear extending around and engageable with the at least one planetary gear, the stationary ring gear having a plurality of stationary ring gear teeth; and
   a moveable ring gear extending around and engageable with the at least one planetary gear, the moveable ring gear having a plurality of moveable ring gear teeth, wherein a number of stationary ring gear teeth is different from a number of moveable ring gear teeth,
   wherein the at least one planetary gear simultaneously contacts both the stationary ring gear and the movable ring gear, and
   wherein a pitch diameter of the stationary ring gear is identical to a pitch diameter of the moveable ring gear.

2. The gear reducer of claim 1, further comprising:
   a housing for the at least one planetary gear, the stationary ring gear, and the moveable ring gear;
   an output configured to be driven by the moveable ring gear; and
   a spring compliance member between the housing and the output such that the spring compliance member reduces backlash of the gear reducer upon driving of the output by the gear reducer.

3. The gear reducer of claim 2, further comprising an input for driving the gear reducer.

4. The gear reducer of claim 3, wherein the input is an input shaft fixedly attached to the rotatable planet carrier.

5. The gear reducer of claim 4, wherein the input shaft is attached to the rotatable planet carrier by a set screw.

6. The gear reducer of claim 3, wherein the input is a sun gear engageable with the at least one planetary gear.

7. The gear reducer of claim 2, wherein the spring compliance member is a generally flat annular resilient member.

8. The gear reducer of claim 2, wherein the spring compliance member is an O-ring.

9. The gear reducer of claim 1, wherein the at least one planetary gear has a plurality of planetary gear teeth engaged with the plurality of stationary ring gear teeth and with moveable ring gear teeth.

10. The gear reducer of claim 1, wherein a difference between the number of stationary ring gear teeth and the number of moveable ring gear teeth is a multiple of the number of planetary gears.

11. The gear reducer of claim 1, wherein a gear ratio of the gear reducer is 100 or greater.

12. The gear reducer of claim 1, wherein the moveable ring gear is rotatable with respect to the stationary ring gear.

13. The gear reducer of claim 1, wherein the at least one planetary gear comprises a plurality of planetary gears substantially equally radially spaced on the rotatable gear carrier.

14. The gear reducer of claim 1, wherein an effective point of force transfer between the at least one planetary gear and the stationary ring gear is the same as the effective point of force transfer between the at least one planetary gear and the moveable ring gear.

* * * * *